United States Patent [19]
Coffman

[11] Patent Number: 5,507,846
[45] Date of Patent: Apr. 16, 1996

[54] APPARATUS FOR PRODUCING METHANE-RICH GAS USING A FIXED KILN WITH ROTOR STEAM GASIFIER

[75] Inventor: John A. Coffman, Ballston Spa, N.Y.

[73] Assignee: Wright Malta Corporation, Ballston Spa, N.Y.

[21] Appl. No.: 349,905

[22] Filed: Dec. 6, 1994

[51] Int. Cl.⁶ .................... C10J 3/20; C10J 3/30
[52] U.S. Cl. .................... 48/111; 48/86 R; 48/87; 48/108; 48/122; 202/113; 202/117; 202/128; 202/129; 414/198; 414/200; 414/208
[58] Field of Search .................... 48/86 R, 108, 48/111, 89, 78, 85, 122, 61, 87; 414/208, 150, 158, 217, 221, 169, 172, 167, 198, 199, 200, 287; 202/117, 118, 113, 128, 129

[56] References Cited

U.S. PATENT DOCUMENTS

| | | | |
|---|---|---|---|
| 2,151,514 | 3/1939 | Heinen | 414/221 |
| 2,912,126 | 11/1959 | Alspaugh et al. | 414/221 |
| 2,966,215 | 12/1960 | Durkee | 202/118 |
| 2,983,653 | 5/1961 | Danulat et al. | 202/118 |
| 4,244,705 | 1/1981 | Seidl et al. | 48/86 R |
| 4,261,795 | 4/1981 | Reilly | 202/118 |
| 4,308,103 | 12/1981 | Rotter | 48/111 |
| 4,397,657 | 8/1983 | Selep et al. | 48/86 R |
| 4,412,889 | 11/1983 | Oeck | 202/118 |
| 4,597,772 | 7/1986 | Coffman | 48/111 |

*Primary Examiner*—Peter Kratz
*Attorney, Agent, or Firm*—Ratner & Prestia

[57] ABSTRACT

A gasifier for producing methane-rich fuel gas from a biomass material feed includes at least one cylindrical vessel, and an axially extending rotor mounted within the vessel. A feeding system is mounted to the vessel at the input end for introducing feed to the vessel. The feeding system includes two independently operated pistons, slidable in an inclined cylinder, and two slide valves, disposed in a vertical pipe above the inclined cylinder. The slide valves serve to apportion the amount of feed delivered to the gasifier, while the pistons selectively seal the pressurized interior of the kiln from the feed hopper. A discharge system for removing residue from the kiln also includes two pistons which selectively seal kiln from the environment. The gasifier of the present invention may also include double-plate intake and exhaust manifolds, and a box beam rotor, optionally including zinc oxide disposed in the hollow, central rotor shaft defined by the vanes of the box beam rotor.

13 Claims, 4 Drawing Sheets

APPARATUS FOR PRODUCING METHANE-RICH GAS USING A FIXED KILN WITH ROTOR STEAM GASIFIER

FIELD OF THE INVENTION

This invention relates to a gasifier for the thermo-chemical conversion of a feed of biomass material to a methane-rich gas. More particularly, the present invention is directed to improvements, such as an improved feeding system and an improved discharge system, for the gasifier.

BACKGROUND OF THE INVENTION

The thermo-chemical conversion of biomass material by steam treatment has been described in U.S. Pat. No. 4,597,772, which is incorporated herein by reference, and the articles disclosed in the background portion of the '772 patent. The term "biomass material" is defined in the '772 patent and includes solid waste, paper, wood pulp, sawdust, wood chips, and the like.

Most biomass gasification processes are derived from coal technology, and utilize partial oxidation, along with pyrolysis, to convert biomass material into gaseous fuel. If air is used, the fuel gas is "low Btu," about 175 Btu/scf, because of the high nitrogen content in air acting as a diluent. If oxygen-blown, the fuel gas produced is "medium Btu," about 350 Btu/scf.

Synthetic natural gas (SNG) is essentially all methane, and has a heating value of about 1,000 Btu/scf. SNG cannot be made from low Btu gas because of the difficulty in removing nitrogen. SNG can be produced from medium Btu gas. Such gas, however, contains a relatively high amount of carbon monoxide, and a "water gas shift" is required in the process to bring the $H_2/CO$ ratio to 3/1 for methanation. This factor, as well as the cost of oxygen, has discouraged consideration of oxygen-blown gasification in making SNG from biomass.

The feeding mechanism of the '772 patent is best shown in FIGS. 1, 6, 7, 8 and 9 of the '772 patent. The feeding system of the '772 patent serves to feed a fixed volume of biomass material, at atmospheric pressure, into the interior of the kiln, which operates at pressures on the order of 300 psi or greater. This is accomplished by supplying biomass material through an angled inlet pipe into a cylinder, within which a ram head reciprocates. A motor-driven valve is disposed below the input pipe, and a valve system serves to equalize the pressure or create a pressure differential on either side of the motor-driven valve. A problem with the feeding system of the '772 patent is that the motor-driven valve does not seal properly over time because of the significant pressure differential of 300 psi acting on the valve. Typically, some biomass material may get caught in the valve, thereby causing it to lose its sealing integrity.

Similarly, the discharge system of the '772 patent could be susceptible to leakage. The discharge system permits the removal of solid residue, which has not been converted to gas, at the output end of the kiln. Although it is anticipated that steam gasification of certain biomass material will be effective to completely convert the biomass material to gas, the gasification process for most biomass material will be about 98–99%. Thus, the small amount of solid residue must be removed periodically. According to the '772 patent as shown in FIGS. 1 and 2, a discharge conduit leads from the kiln, and two stop valves are disposed in the discharge conduit. The first stop valve is opened to permit the residue to move to the portion of the discharge conduit between the two stop valves. Subsequently, the first stop valve is closed and the second stop valve is opened so that the residue is discharged from the discharge conduit into a collection pan.

The vanes used to mix the biomass material are curved, as shown in FIG. 3 of the '772 patent. These curved vanes are difficult to construct, and tend to straighten out over time thereby causing jamming. Also, biomass material tends to lie in the concave portion of each vane, for perhaps a quarter of a turn, where the material undesirably may be heated too quickly.

Accordingly, it would be desirable to provide a feeding system for the gasifier of the '772 patent which is capable of delivering a fixed volume to the kiln without leakage. Furthermore, it would be desirable to provide a discharge system for the gasifier of the '772 patent which is capable of permitting the solid residue to be removed from the kiln without leakage. In addition, improvements relating to the rotor and the intake and exhaust manifolds of the gasifier of the '772 patent would be desirable.

SUMMARY OF THE INVENTION

The present invention provides a means by which a fixed volume of feed can be introduced to a kiln as disclosed in the '772 patent without leakage. The present invention also provides a discharge system for removing solid residue from the kiln without leakage. In addition, the present invention provides an improved rotor and improved intake and exhaust manifolds for use with the gasifier of the '772 patent.

The present invention relates to an apparatus for producing methane-rich fuel gas from a biomass material feed. The apparatus includes at least one cylindrical vessel with an input end and an output end and inclined to permit gravity-driven travel of the feed through the vessel from the input end to the output end. Mounted within the vessel is an axially extending rotor which includes mixing elements for tumbling the feed and conduits mounted to the mixing elements for conducting gas produced from the feed and for heating the feed to provide a continuously increasing temperature profile along the vessel from the input end to the output end. The apparatus also includes a device, such as a motor, for rotating the rotor. The apparatus further includes a feeding system mounted to the vessel at the input end capable of introducing a fixed volume of feed to the vessel without leakage.

The feeding system of the present invention includes a hopper disposed above the vessel for containing feed, and a first vertical pipe having an upper end coupled to the lower end of the hopper. A first slide valve is disposed at the upper end of the first vertical pipe for closing to contain the feed in the hopper, and a second slide valve is disposed at the lower end of the first vertical pipe for closing to contain the feed as the feed is conducted into the first vertical pipe while the first slide valve is open. The feeding system of the present invention further includes an inclined cylinder having an upper end coupled to the lower end of the first vertical pipe at a first opening. A second vertical pipe has an upper end coupled to the lower end of the inclined cylinder at a second opening and a lower end coupled to the input end of the vessel. A first piston slides along the inclined cylinder near the upper end of the inclined cylinder for selectively sealing the first opening. Similarly, a second piston slides along the inclined cylinder near the lower end of the inclined cylinder for selectively sealing the second opening.

According to more specific embodiment of the present invention, a sensor is disposed near the lower end of the second vertical pipe for providing a visual indication of movement of feed into the vessel. Furthermore, a pressure line having a branch line may be coupled to a portion of the inclined cylinder between the first and second openings, and first and second pressure valves may be disposed in the pressure and branch lines for selectively pressurizing and depressurizing this portion of the inclined cylinder.

According to another embodiment of the present invention, a discharge system is mounted to the vessel at the output end for conducting residue from the vessel. The discharge system includes a first inclined discharge pipe having an upper end coupled to the output end of the vessel. A discharge slide valve is disposed near the lower end of the first inclined discharge pipe for closing to contain the residue in the vessel. The discharge system includes an inclined cylinder having an upper end coupled to the lower end of the first inclined discharge pipe at a first opening. A second inclined discharge pipe has an upper end coupled to the lower end of the inclined cylinder at a second opening for conducting the residue to a receiving bin. The discharge system includes a first and a second discharge piston. The first discharge piston slides along the inclined cylinder near the upper end of the inclined cylinder for selectively sealing the first opening. The second discharge piston slides along the inclined cylinder near the lower end of the inclined cylinder for selectively sealing the second opening.

According to more specific embodiment of the present invention, a discharge sensor is disposed in a portion of the inclined pipe between the first opening and the second opening for providing a visual indication of the residue. Furthermore, a discharge pressure line may be coupled to the portion of the inclined cylinder between the first opening and the second opening and a discharge pressure valve may be disposed in the discharge pressure line for selectively pressurizing and depressurizing this portion.

According to another embodiment of the present invention, the rotor is a box beam rotor made up of a number (e.g., four, eight or twelve) of vanes welded together longitudinally to form a hollow, central rotor shaft defined by a first portion of each of the vanes, wherein the remaining portion of each of the vanes form mixing elements.

According to still another embodiment of the present invention, zinc oxide is disposed in the hollow, central rotor shaft near the output end of the vessel. Alternatively, the vessel may be made up of a first, second, and third vessel, arranged in series with one another such that the feed is introduced to the input end of the first vessel and exits through the output end of the third vessel, and zinc oxide is disposed in the hollow, central rotor shaft of the third vessel only.

According to still another embodiment of the present invention, a double-plate intake manifold is disposed at the input end of the vessel and a double-plate exhaust manifold is disposed at the output end of the vessel. Each plate includes a first plate closer to the interior of the vessel and a second plate further from the interior of the vessel. The second plate is spaced from the first plate to form a manifold interior. Each plate has a plurality of holes through which the conduits individually extend. The first plate of each manifold has a central opening through which the rotor extends.

According to more specific embodiment of the present invention, the conduits have at least one bore near their ends to permit communication between the conduits and the manifold interiors. Furthermore, the rotor may have at least one bore near its ends to permit communication between the rotor and the manifold interiors. A plurality of covers may individually engage the plurality of conduits at the ends of the conduits.

It is to be understood that both the foregoing general description and the following detailed description are exemplary, but not restrictive, of the invention.

BRIEF DESCRIPTION OF THE DRAWINGS

The invention is best understood from the following detailed description when read in connection with the accompanying drawings, in which.

DETAILED DESCRIPTION OF THE INVENTION

Figure 1:
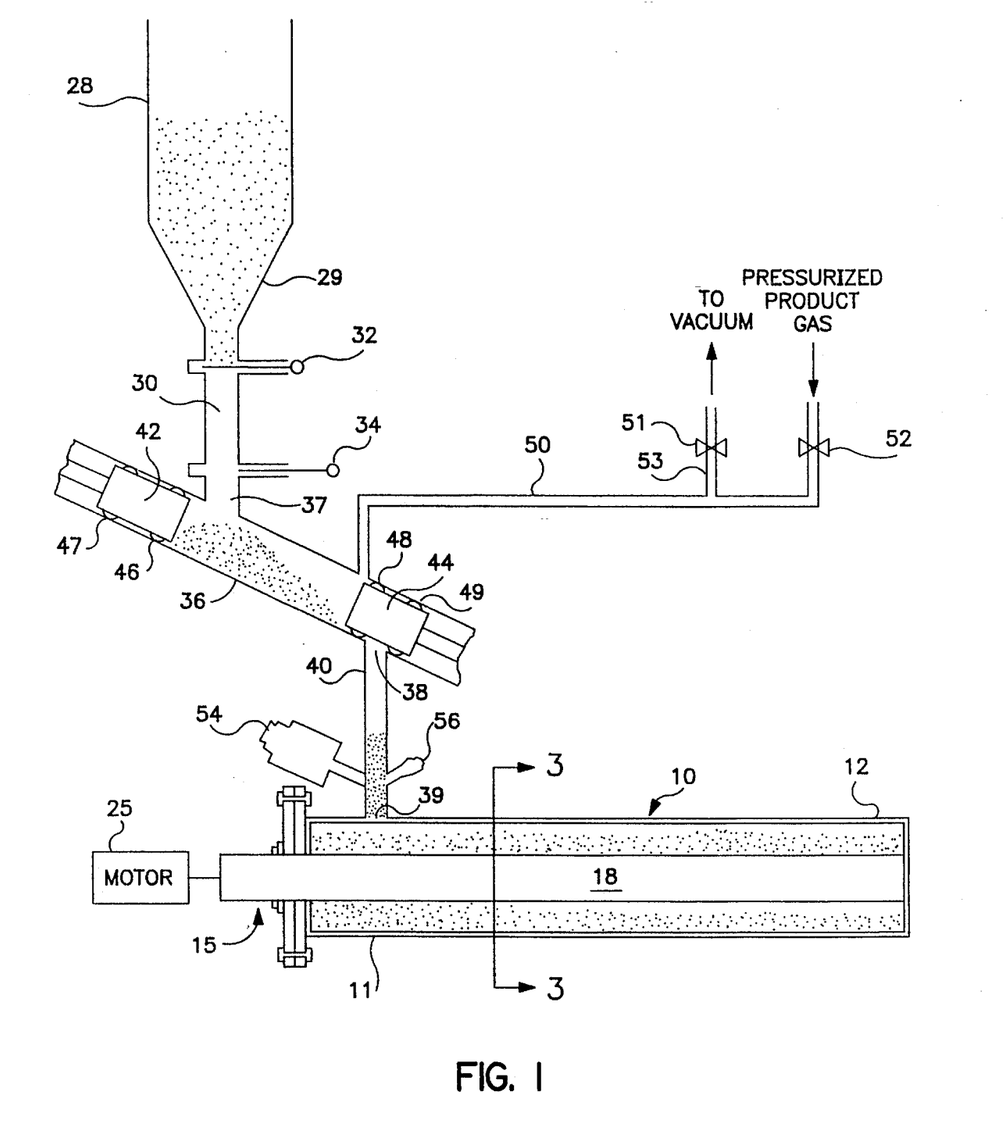
FIG. 1 is a schematic view of a feeding system in accordance with the present invention.
Figure 2:
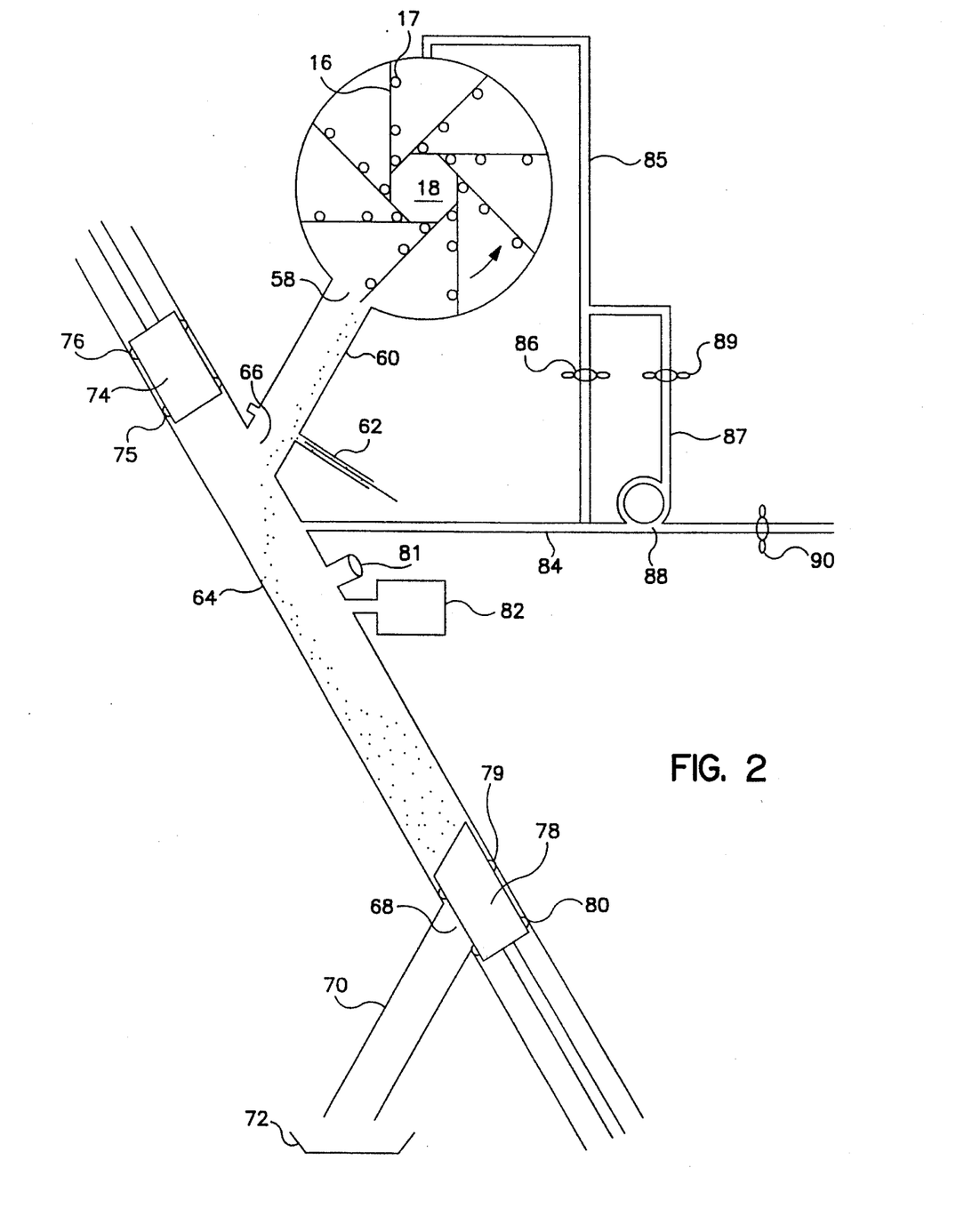
FIG. 2 is a schematic view of a discharge system in accordance with the present invention.

FIG. 1 is a schematic view of a feeding system in accordance with the present invention and its relationship with a rotor kiln. More specifically, FIG. 1 shows a cylindrical vessel 10 (or kiln) identical to the kiln described in the '772 patent except as otherwise specified herein. Vessel 10 has an input end 11 and an output end 12. Near input end 11, biomass feed is introduced to vessel 10. Near output end 12, a partially gasified biomass is conducted to a second cylindrical vessel or, in the event that the biomass has been completely gasified, to a double-plate exhaust manifold and the solid residue is discharged via a discharge system as shown in FIG. 2. Vessel 10 is inclined to permit gravity-driven travel of the feed through vessel 10 from input end 11 to output end 12, as described in the '772 patent.

Figure 3:
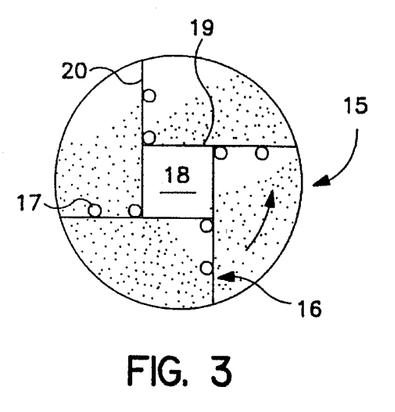
FIG. 3 is a cross-sectional view of the kiln taken along line 3—3 of FIG. 1.

Mounted within vessel 10 is an axially extended rotor 15, as shown in FIGS. 1–3. Rotor 15 includes a number of mixing elements (or vanes) 16. Mixing elements 16 serve to tumble the feed as it travels along vessel 10. In addition, a number of conduits 17 are mounted to the mixing elements for conducting gas produced from the feed in the opposite direction that the feed is travelling. As disclosed in the '772 patent, this gas gives off heat to the feed to provide a continuously increasing temperature profile along vessel 10 from input end 11 to output end 12.

Rotor 15 may be configured as any known rotor, such as that shown in FIG. 3 of the '772 patent. According to an embodiment of the present invention, rotor 15 is configured as a box beam rotor as shown in FIGS. 2 or 3. A box beam rotor is made up of a number of vanes 16 which are welded together longitudinally to form a hollow, central rotor shaft 18, as shown as FIGS. 2 and 3. Such a rotor shaft 18 is defined by a first portion 19 of each of the vanes. The remaining portion 20 of each of the vanes serve the mixing element function. FIG. 2 shows a box beam rotor with eight vanes, while FIG. 3 shows a box beam rotor with four vanes, although other numbers of vanes, such as ten or twelve, can be used if appropriate.

The box beam rotor, in accordance with the present invention, is relatively easy to manufacture and will be made from steel in the least expensive form: straight, flat, strip stock. Welding assembly of the rotor is straightforward, with the only requirement being that the welding be kept symmetrical, thereby avoiding distortion. The assembled box beam rotor is rigid and resists gravitational and torsional stress.

Figure 4:
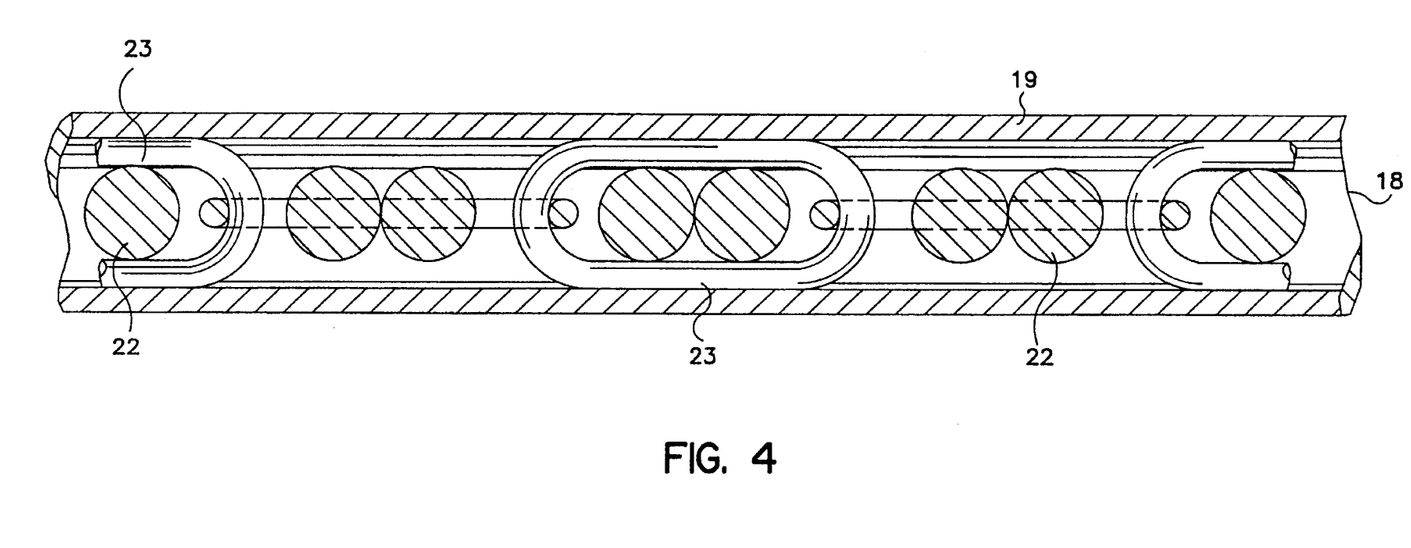
FIG. 4 is an enlarged longitudinal view of a central rotor shaft in accordance with the present invention.

FIG. 4 is an enlarged longitudinal view of a central rotor shaft in accordance with the present invention. FIG. 4 also shows an alternative embodiment of the present invention, namely placing zinc oxide pellets 22 within hollow central rotor shaft 18. As disclosed in the '772 patent, zinc oxide pellets are used in the hot section of the gasifier (near output end 12 or in the third of three kilns) to react with any $H_2S$ and traces of HCl that escape capture by potassium carbonate in the kiln. Zinc oxide pellets may be placed directly in shaft 18. Alternatively, a chain 23 may be placed in shaft 18 through ports at the end of the shaft, and zinc oxide pellets 22 could be disposed within the links of chain 23. As in the '772 patent, zinc oxide pellets 22 must be emptied and refilled at appropriate maintenance intervals.

As shown in FIG. 1, a motor 25 serves to rotate rotor 15. The rotational speed may vary depending on the application, but typically may range from about four to ten rpm. As shown in FIG. 1, a feeding system is mounted to vessel 10 at input end 11 for introducing biomass feed into vessel 10 for gasification. The feeding system includes a hopper 28 which contains biomass feed for delivery to vessel 10. The size of and materials used to construct the hopper 28 may vary as needed. Hopper 28 is disposed vertically above vessel 10 and may include a lower end 29 having an inverted conical shape. A first vertical pipe 30 is coupled to lower end 29 of hopper 28. The upper end of vertical pipe 30 is coupled to lower end 29 of hopper 28.

A first slide valve 32 and a second slide valve 34 are disposed in first vertical pipe 30. More particularly, first slide valve 32 is disposed at or near the upper end of first vertical pipe 30. As shown in FIG. 1, first slide valve 32 is closed to contain the feed in hopper 28. Second slide valve 34 is disposed at the lower end of vertical pipe 30. When closed, second slide valve 34 serves to contain the feed as the feed is conducted into first vertical pipe 30 while first slide valve 32 is open. The vertical displacement between first slide valve 32 and second slide valve 34 dictates the amount of fixed volume which will be delivered to the vessel 10 and can vary depending on the particular need.

An inclined cylinder 36 has an upper end which is coupled to the lower end of first vertical pipe 30 at a first opening 37. The inclination of inclined cylinder 36 may vary over a wide range, but an angle of about 30½ from horizontal is appropriate for most biomass materials. Feed is conducted from first vertical pipe 30 to inclined cylinder 36 through first opening 37. At its lower end, inclined cylinder 36 has a second opening 38 at which the upper end of a second vertical pipe 40 is coupled to inclined cylinder 36. Feed passes from inclined cylinder 36 to second vertical pipe 40 through second opening 38. At the lower end of second vertical pipe 40 is a third opening 39, through which feed passes from second vertical pipe 40 to the interior of kiln 10.

Disposed within inclined cylinder 36 is a first piston 42 and a second piston 44. First piston 42 includes an inner seal 46 and an outer seal 47, and second piston 44 includes an inner seal 48 and an outer seal 49. Seals 46–49 may be any known seals, such as O-ring seals fitted within grooves of the pistons. First piston 42 and second piston 44 are slidable along the inclined cylinder. First piston is capable of selectively sealing first opening 37 by moving downward along inclined cylinder 36 from its position as shown in FIG. 1 until inner seal 46 has moved pass first opening 36, thereby sealing the interior of first vertical pipe 30 from the interior inclined 36. Similarly, second piston 44 serves to selectively seal second opening 38 so long as inner seal 48 is between first opening 38 and the interior of inclined cylinder 36, as in the position shown in FIG. 1.

A pressure line 50 is in fluid communication with the portion of inclined cylinder 36 between first opening 37 and second opening 38. Pressure line 50 leads to a branch line 53, which leads to a vacuum via a first pressure valve 51. Pressure line 50 leads to a pressurized product gas source via a second pressure valve 52. A pressurized product gas source could be the interior of a manifold of a vessel which contains gas produced by the gasifier of the present invention. The pressure of such gas is about 300 psi.

In operation, both first slide valve 32 and second slide valve 34 are initially closed, while first piston 42 and second piston 44 are in the positions as shown in FIG. 1. Also, pressure valves 51, 52 are initially closed so that the pressure in the portion of inclined cylinder 36 between first opening 37 and second opening 38 is the same as the pressure in hopper 28, namely about atmospheric. In order to deliver a fixed volume of biomass to vessel 10, first slide valve 32 is opened to permit biomass to fill the area in first vertical pipe 30 between first slide valve 32 and second slide valve 34. Once filled, first slide valve 32 is then closed. Next, second slide valve 34 is opened thereby permitting the fixed volume of biomass material to move downward through opening 37 and into inclined cylinder 36 between first piston 42 and second piston 44.

The volume of the portion in inclined cylinder 46 between first piston 42 and second piston 44 is greater than the volume of the portion of first vertical pipe 30 between first slide valve 32 and second slide valve 34. This difference in volume allows first piston 42 to be moved downward to the right to push the biomass material towards second piston 44, without compacting the biomass material. After first piston 42 is moved sufficiently far to seal opening 37, second pressure valve 52 is opened briefly to equalize the pressure between the interior of second vertical pipe 40 and the portion of inclined cylinder 36 between first opening 37 and second opening 38. Then, after second pressure valve 52 is closed, second piston 44 is moved to the right (as shown in FIG. 1) thereby exposing opening 38. First piston 42 is then driven further to the right (as shown in FIG. 1) until it approaches second opening 38 so that all of the biomass material is moved into second vertical pipe 40 and subsequently through third opening 39 and into vessel 10.

When substantially all of the material is pushed out of inclined cylinder 36, first piston 42 is moved back to a position over opening 37, and second piston 44 is moved to the position as shown in FIG. 1, namely over opening 38. Then, first pressure valve 51 is opened thereby venting the portion in inclined cylinder 36 between first piston 42 and second piston 44. Once this portion of inclined cylinder 36 has been returned to atmospheric pressure or below atmospheric pressure, first pressure valve 51 is closed and first piston 42 is moved further up inclined cylinder 36, to the position shown in FIG. 1, and the next cycle of feeding commences.

According to a more specific embodiment of the present invention, a sensor 54 is disposed near the lower end of second vertical pipe 40. Sensor 54 may be a visual monitor for indicating movement of the feed into the vessel 10. A light 56 serves to ensure accurate visual identification of the movement of the feed. For example, once it is observed that all of the feed from second vertical pipe 40 has been delivered to vessel 10, the next feeding cycle should commence.

FIG. 2 is a schematic view of a discharge system in accordance with the present invention. FIG. 2 also shows a cross-sectional view of vessel 10 and rotor 15, with an eight-vane rotor. As can be seen, hollow central shaft 18 is defined by a first portion of each of the eight vanes 16. The remaining portion of the vanes 16 serve as mixing elements. Furthermore, conduits 17 are disposed preferably as shown on the back sides of vanes 16 so that heat is transferred more evenly along vanes 16 to the biomass material being gasified. With such a configuration and with conducting return gas through hollow central rotor shaft 18, the external back coming pipes disposed on the outer circumference of vessel 10, as disclosed in the '772 patent, may be eliminated. Sufficient heat is transferred to the biomass from the gas being conducted through the conduits 17 and hollow central rotor shaft 18.

Near the output end of vessel 10 is an output opening 58 disposed near the bottom of the vessel 10. Because not all of the biomass is converted to a methane-rich gas and to avoid the buildup of the unconverted residue, a discharge system is mounted to vessel 10 at output end 12 for conducting the residue from vessel 10.

The discharge system includes a first inclined discharge pipe 60 which is coupled at its upper end to vessel 10 at output opening 58. A discharge slide valve 62 is disposed at or near the lower end of first inclined discharge pipe 60. Discharge slide valve 62 closes to contain residue in discharge pipe 60.

First inclined discharge pipe 60 opens into an inclined cylinder 64 through second opening 66. Inclined cylinder 64 may be inclined at varying degrees depending on the angle of repose of the residue, and may be disposed at 60° from horizontal. Inclined cylinder 64 has a third opening 68 near its lower end which opens into a second inclined discharge pipe 70 which leads to a receiving bin 72 for collecting the residue.

Disposed within and slidable along inclined cylinder 64 is a first discharge piston 74 and a second discharge piston 78. Similar to pistons 42, 44, first discharge piston 74 has an inner seal 75 and an outer seal 76, while second discharge piston 78 has an inner seal 79 and an outer seal 80. Seals 75, 76, 79, 80 are any known conventional seals, such as O-ring seals disposed within grooves of the pistons. First discharge piston 74 serves to selectively seal second opening 66, while second discharge piston 78 serves to selectively seal third opening 68.

In operation, slide valve 62 is initially open and pistons 74, 78 are in the positions as shown. Initially, inner seal 79 of discharge piston 78 serves to seal the pressure of the kiln (approximately 300 psi) from atmospheric pressure existing in second discharge pipe 70. As shown, residue is dribbling out of the kiln through first inclined discharge pipe 60 through opening 66 and down inclined cylinder 64 until it rests on second discharge piston 78. A discharge sensor 82 is disposed in a portion of inclined cylinder 64 between second opening 66 and third opening 68 for providing a visual indication of the residue. Light 81 serves to ensure an accurate indication of the residue level. As soon as the residue level reaches the level sensed by sensor 82, slide valve 62 is closed, thereby cutting off residue flow, and first discharge piston 74 is positioned over second opening 66 thereby sealing first inclined discharge pipe 60 from inclined cylinder 64.

A discharge pressure line 84 is coupled to a portion of the inclined cylinder 64 between second opening 66 and third opening 68. A first branch line 85 leads to the kiln, and first valve 86 is disposed in this branch line 85. A second branch line 87 also leads to the kiln and a pump 88 and a second valve 89 are disposed in this second branch line 87. With second valve 89 open, the gas in the portion of inclined cylinder 64 between second opening 66 and third opening 68 is pumped back into the kiln and replaced by air at atmospheric pressure. Next, second discharge piston 78 is moved downward just beyond third opening 68 thereby permitting residue to drop through third opening 68 and second discharge pipe 70 and into receiving bin 72. Once all of the residue is removed, second discharge piston 78 is moved back into its original position as shown in FIG. 2.

Then, air is pumped from the portion of inclined cylinder 64 between second opening 66 and third opening 68 by pump 88 out through discharge pressure line 84 through open valve 90. Subsequently, the portion of inclined cylinder 64 between second opening 66 and third opening 68 is filled through branch equalizing line 85 with gas from the kiln through open valve 86. Then, first discharge piston 74 is moved back to its original position, as shown in FIG. 2. Finally, the slide valve is opened, dropping residue accumulated above the valve into the cylinder, and completing the cycle to the point shown in the sketch.

In both the feeding and discharge systems, the pistons are never moved across any openings under any pressure differential, thereby avoiding erosion of the seals by high velocity gas streams. The discharge system must be maintained at a temperature above the dew point (about 350° F.), so that steam and the product gas do not condense and make the residue sticky. Initially, warmth will be provided by heating tape; at steady state, sufficient warmth is likely to be derived from oxidation of residual char on exposure to air.

Figure 5:
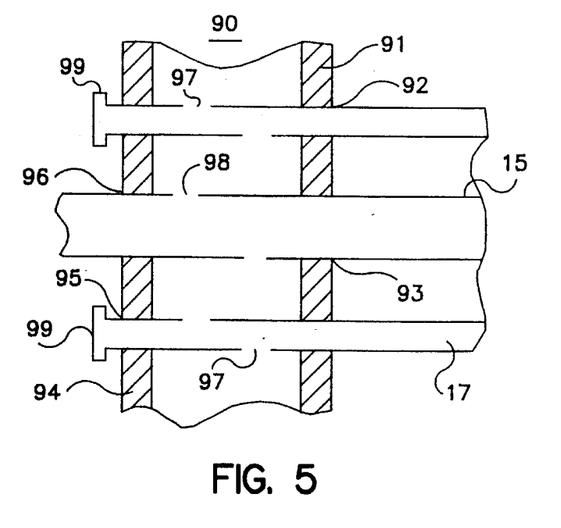
FIG. 5 is an enlarged sectional view of a portion of an intake or exhaust manifold in accordance with the present invention.
Figure 6:
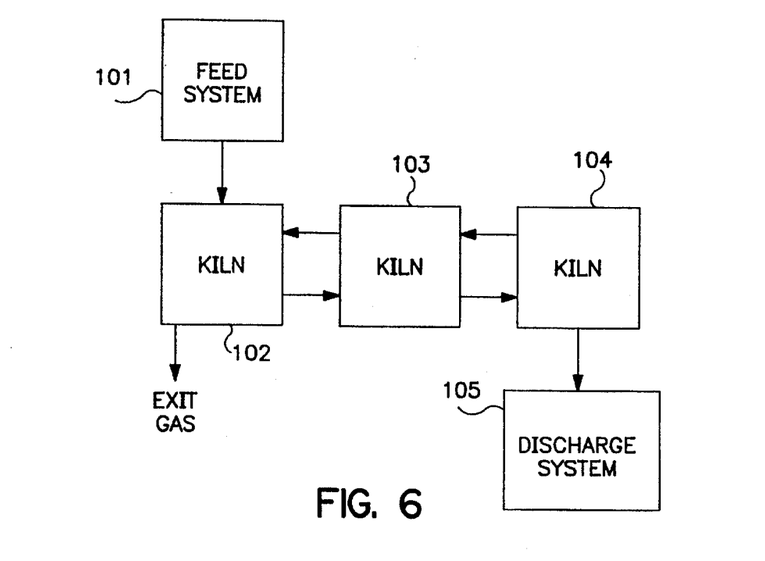
FIG. 6 is a schematic view showing three kilns disposed in series with one another in accordance with the present invention.

FIG. 5 is an enlarged sectional view of an intake or exhaust manifold in accordance with the present invention. An intake manifold is simply a mirror image of an exhaust manifold. In addition to the components shown in FIG. 5, each manifold has a conduit extending from the top, bottom, or outer plate and in communication with the manifold interior. For example, the intake manifold, which is closest to the feeding system, will have a conduit for conducting the exit gas from the manifold interior. The exhaust manifold, which is closest to the discharge system, will have a conduit extending between the output end of the vessel and the manifold interior. Furthermore, in the event that there is more than one vessel disposed in series as shown in FIG. 6, the manifolds adjacent one another in adjacent vessels have conduits extending between one another. For simplicity, the manifold in FIG. 5 will be referred to below as an intake manifold, but the same components may be used for an exhaust manifold.

FIG. 5 shows a portion of a double plate intake manifold which would be disposed at the input end 11 of vessel 10. The intake manifold consists of a first plate 91 closer to the interior of vessel 10 and having a plurality of holes 92 through which conduits 17 individually extend. First plate 91 also has a central opening 93 through which rotor 15 extends. A second plate 94 is disposed further from the interior of vessel 10 and is spaced from first plate 91 to form a manifold interior which is defined by the area between the two plates. Second plate 94 also has a plurality of holes 95 through which conduits 17 individually extend. Similarly, second plate 94 has a central opening 96 through which rotor 15 extends. As mentioned above, the double plate exhaust manifold would be the mirror image of this manifold, similarly having a first and second plate.

Conduits 17 have at least one bore 97 near their ends to permit communication between the interior of the conduits and the manifold interiors. Similarly, rotor 15 may have at least one bore 98 near its end to permit communication between the rotor interior and the manifold interiors. Finally, covers 99 individually engage the conduits 17 at the ends of the conduits for closing the interior of the conduits to force the gas out of bore 97 and into the manifold interiors.

FIG. 6 shows a schematic diagram of three kilns disposed in series with one another. More specifically, a feeding system 101 is shown above a first kiln 102 which is arranged in series with a second kiln 103 and a third kiln 104. The feed is introduced from feeding system 101 to the first kiln 102 and then is conveyed to second kiln 103 then further to third kiln 104. The conveyance of the feed between kilns may be carried out in the same manner as shown in the '772 patent. The residue exits from third kiln 104 to discharge system 105 as described above. In this embodiment, only third kiln 104 would include zinc oxide disposed in the hollow central shaft of this kiln.

The arrows moving from left to right in the system represent the biomass feed and the remaining residue, while the arrows moving towards the left represent the returning gas. The manifold as described in FIG. 5 would be present as an exhaust manifold in the exit end of kiln 104. All of the other double plate manifolds would include a conduit extending from the double plate manifold of one kiln to an adjacent double plate manifold in an adjacent kiln, thereby permitting fluid flow communication between adjacent double plate manifolds and permitting the gas to be conducted back through the system. Finally, the gas exiting first kiln 102 might be fed to a gas turbine generator, a heat recovery boiler, and a steam turbine generator.

Although illustrated and described herein with reference to certain specific embodiments, the claims are not intended to be limited to the details shown. Rather, the claims should be read to include various modifications of the details shown without departing from the spirit of the invention.

What is claimed:

1. An apparatus for producing methane-rich fuel gas from a biomass material feed, said apparatus comprising:
    at least one cylindrical vessel with an input end and an output end and inclined to permit gravity-driven travel of said feed through said vessel from said input end to said output end;
    an axially extending, box beam mounted within said vessel and including:
        (a) a plurality of vanes having a first and second portion, and welded together longitudinally to form a hollow, central rotor shaft defined by said first portion of each of said vanes,
        (b) a plurality of mixing elements, formed by said second portion of each of said vanes for tumbling said feed as seed feed travels along said vessel, and
        (c) a plurality of conduits mounted to said mixing elements for conducting gas produced from said feed and for heating said feed to provide a continuously increasing temperature profile along said vessel from the input end to the output end;
    means for rotating said rotor; and
    a feeding system mounted to said vessel at the input end for introducing feed to said vessel, said feeding system having:
        (a) a hopper having a lower end and disposed above said vessel for containing feed,
        (b) a first vertical pipe having an upper end coupled to the lower end of said hopper and having a lower end,
        (c) a first slide valve disposed at the upper end of said first vertical pipe for closing to contain the feed in said hopper,
        (d) a second slide valve, disposed at the lower end of said first vertical pipe for closing to contain the feed as the feed is conducted into said first vertical pipe while said first slide valve is open,
        (e) an inclined cylinder having an upper end coupled to the lower end of said first vertical pipe at a first opening and having a lower end,
        (f) a second vertical pipe having an upper end coupled to the lower end of said inclined cylinder at a second opening and a lower end coupled to the input end of said vessel,
        (g) a first piston slidable along said inclined cylinder near the upper end of said inclined cylinder for selectively sealing said first opening, and
        (h) a second piston slidable along said inclined cylinder near the lower end of said inclined cylinder for selectively sealing said second opening.

2. An apparatus in accordance with claim 1 further comprising a sensor disposed near the lower end of said second vertical pipe for providing a visual indication of movement of feed into said vessel.

3. An apparatus in accordance with claim 1 further comprising:
    a pressure line coupled to a portion of said inclined cylinder between said first opening and said second opening and extending to a pressurized product gas source;
    a branch line extending from said pressure line to vacuum;
    a first pressure valve disposed in said branch line for selectively depressurizing said portion; and
    a second pressure valve disposed in said pressure line for selectively pressurizing said portion.

4. An apparatus in accordance with claim 1, wherein said plurality of vanes comprises four vanes.

5. An apparatus in accordance with claim 1, wherein said plurality of vanes comprises eight vanes.

6. An apparatus in accordance with claim 1, further comprising zinc oxide disposed in said hollow, central rotor shaft near the output end of said vessel.

7. An apparatus in accordance with claim 1, wherein said at least one vessel comprises a first, second, and third vessel, arranged in series with one another such that the feed is introduced to the input end of said first vessel and exits through the output end of said third vessel, and said apparatus further comprises zinc oxide disposed in said hollow, central rotor shaft of said third vessel.

8. An apparatus in accordance with claim 1, further comprising:
    a double-plate intake manifold, disposed at the input end of said vessel and having:
        (a) a first plate closer to the interior of said vessel and having a plurality of holes through which said plurality of conduits individually extend and having a central opening through which said rotor extends, and
        (b) a second plate further from the interior of said vessel, spaced from said first plate to form a manifold interior, and having a plurality of holes through which said plurality of conduits individually extend and having a central opening through which said rotor extends; and a double-plate exhaust manifold, disposed at the output end of said vessel and having:
  (a) a first plate closer to the interior of said vessel and having a plurality of holes through which said plurality of conduits individually extend and having a central opening through which said rotor extends, and
  (b) a second plate further from the interior of said vessel, spaced from said first plate to form a manifold interior, and having a plurality of holes through which said plurality of conduits individually extend.

9. An apparatus in accordance with claim 8, wherein:

said plurality of conduits have at least one bore near their ends to permit communication between the conduits and the manifold interiors, and said rotor has at least one bore near its ends to permit communication between said rotor and the manifold interiors.

10. An apparatus in accordance with claim 9 further comprising a plurality of covers for individually engaging said plurality of conduits at the ends of the conduits.

11. An apparatus in accordance with claim 1 wherein said feed becomes a residue as a result of the gasification process and further comprising a discharge system mounted to said vessel at the output end for conducting said residue from said vessel and having:
  (a) a first inclined discharge pipe having an upper end coupled to the output end of said vessel and having a lower end,
  (b) a discharge slide valve disposed near the lower end of said first inclined discharge pipe for closing to contain the residue in said vessel,
  (c) an inclined cylinder having an upper end coupled to the lower end of said first inclined discharge pipe at a first opening and having a lower end,
  (d) a second inclined discharge pipe having an upper end coupled to the lower end of said inclined cylinder at a second opening for conducting the residue to a receiving bin,
  (e) a first discharge piston slidable along said inclined cylinder near the upper end of said inclined cylinder for selectively sealing said first opening, and
  (f) a second discharge piston slidable along said inclined cylinder near the lower end of said inclined cylinder for selectively sealing said second opening.

12. An apparatus in accordance with claim 11 further comprising a discharge sensor in a portion of said inclined cylinder between said first opening and said second opening for providing a visual indication of the residue.

13. An apparatus in accordance with claim 11 further comprising a discharge pressure line coupled to said portion of said inclined cylinder between said first opening and said second opening and a discharge pressure valve disposed in said discharge pressure line for selectively pressurizing and depressurizing said portion.

* * * * *